United States Patent [19]
Dana

[11] Patent Number: 5,807,162
[45] Date of Patent: Sep. 15, 1998

[54] GRINDING APPARATUS, AND PROCESS FOR THE OPERATION THEREOF

[75] Inventor: Alden P. Dana, Hartland, Vt.

[73] Assignee: Blanchard Windsor Corp., Windsor, Vt.

[21] Appl. No.: 675,577

[22] Filed: Jul. 3, 1996

[51] Int. Cl.$^6$ ................................................... B24B 47/14
[52] U.S. Cl. ............................ 451/28; 451/413; 451/364
[58] Field of Search ............................ 451/28, 413, 364, 451/398, 285, 274, 283

[56] References Cited

U.S. PATENT DOCUMENTS

| 3,481,082 | 12/1969 | Leathley | 451/364 |
|---|---|---|---|
| 3,772,961 | 11/1973 | Siebert | 451/413 |
| 3,872,626 | 3/1975 | White | 51/129 |
| 4,292,699 | 10/1981 | Szabo | 51/94 R |
| 4,367,357 | 1/1983 | Shackleton | 51/105 SP |
| 4,387,014 | 6/1983 | Stengel | 451/413 |
| 4,481,742 | 11/1984 | Shimizu et al. | 451/14 |
| 4,667,445 | 5/1987 | Kimura | 51/131.1 |
| 4,890,420 | 1/1990 | Azimi | 51/122 |

Primary Examiner—Robert A. Rose
Attorney, Agent, or Firm—David J. Cole

[57] ABSTRACT

A grinding apparatus comprises a table having a first bearing surface; a chuck mounted on the table for rotation about a chuck axis and provided with means for holding a workpiece, the chuck having on its underside a second bearing surface, such that when the chuck is stationary, the second bearing surface rests on the first bearing surface; a grinding head having a least one grinding surface capable of grinding a workpiece mounted on the table, the grinding head being mounted for rotation about a head axis substantially parallel to the chuck axis; and transport means for moving the chuck relative to the grinding head in both directions along a transport axis substantially perpendicular to both the chuck axis and the head axis. To allow rotation of the chuck to begin smoothly, the apparatus has lubricating means provided on the table for introducing a lubricating fluid under superatmospheric pressure between the table and the chuck, thereby causing the chuck to lift away from the table; and control means arranged to first introduce the lubricating fluid through the lubricating means while the chuck is not rotating relative to the table, and thereafter to cause the chuck to rotate relative to the table.

19 Claims, 4 Drawing Sheets

I

GRINDING APPARATUS, AND PROCESS FOR THE OPERATION THEREOF

BACKGROUND OF THE INVENTION

This invention relates to a grinding apparatus and to a process for the operation thereof. More specifically, this invention relates to a grinding apparatus provided with a method of lubricating a rotating chuck so as to reduce the size of motor needed to rotate the chuck when such rotation begins.

One commercial type of grinding apparatus suitable for the grinding of large workpieces, for example large steel plates, is the so-called "vertical spindle, rotary chuck, sliding table type"; this type of grinding apparatus is illustrated in, for example, U.S. Pat. No. 3,872,626, assigned to the same assignee as the present application. This type of grinding apparatus comprises a table and a chuck mounted on the table for rotation of about a chuck axis (normally vertical); one or more workpieces are held upon the upper surface by appropriate retaining means, which can be either mechanical or electromagnetic. A grinding head, provided with at least one grinding surface, is mounted for rotation about a head axis substantially parallel to the chuck axis, and thus normally vertical. The table is provided with transport means for moving the chuck relative to the grinding head in both directions along an axis substantially perpendicular to both the chuck axis and the head axis, and thus normally horizontal.

This type of grinding apparatus is typically used in the following manner. The table and chuck are first disposed with the chuck stationary and spaced from the grinding head. One or more workpieces are placed upon the chuck; because of their size, the workpieces normally require mechanical handling, and the spacing of the chuck from the grinding head allows plenty of room around the chuck for the workpieces to be moved by an overhead crane, a forklift or other mechanical handling device. The retaining means are operated to hold the workpiece(s) firmly upon the chuck, and torque is applied to the chuck to cause it to rotate relative to the table. At about the same time, the grinding head, which has hitherto been held stationary, is rotated. Once the chuck and grinding head are rotating at the required speeds, the transport means is operated to move the table and chuck toward the grinding head, thus causing the grinding surfaces to grind the upper surfaces of the workpiece(s). Once the desired amount of material has been removed from the workpiece(s) (the grinding head allows the grinding surfaces to be adjusted vertically to control the amount of material removed), the sequence of operations is reversed, with the chuck and table being moved away from the grinding head and their rotation stopped, so that the finished workpiece(s) can be removed from the chuck.

This type of grinding apparatus can be made capable of handling very large workpieces. For example, prior to the present invention, the present assignee sold an apparatus having a 120 inch (3.05 m) diameter chuck capable of handing workpieces weighing in excess of 10,000 kg. However, even this size of apparatus is incapable of grinding some large steel plates used in industry (for example, the shipbuilding industry) and accordingly there is a need for still larger grinding apparatus.

One problem encountered with known vertical spindle, rotary chuck, sliding table type grinding apparatus is difficulty in starting the rotation of the chuck. Although the chuck is of course lubricated to facilitate its rotation, with the commercial apparatus having the lower end of the chuck disposed in an oil bath held on the upper surface of the table, operators find that a large torque must be applied to the chuck to begin its rotation, and that the chuck begins to move with a pronounced jerk. Once the chuck is rotating at a modest angular velocity, the torque necessary to increase this angular velocity to its final value (typically about 5 rpm.). The high torque necessary to cause initial movement of the chuck increases the size of the electric motor necessary to move the chuck and may place excessive demands upon the electricity supply in some installations; increasing the size of this motor also increases the cost of the grinding apparatus. Moreover, given the weight of the workpiece(s) resting upon the chuck, any jerkiness in the initial motion of the chuck is undesirable because any movement of the workpiece(s) relative to the chuck poses a serious risk of damage to the apparatus and injury to workers. Furthermore, the difficulty of initial movement of the chuck appears to increase sharply with the size of the chuck.

The present inventions relates to a vertical spindle, rotary chuck, sliding table type grinding apparatus having a lubricating system designed to allow smooth initial movement of the chuck without the need to apply high torque thereto, and to a process for using such an apparatus.

SUMMARY OF THE INVENTION

Accordingly, this invention provides a grinding apparatus comprising:

a table having a first bearing surface;

a chuck mounted on the table for rotation about a chuck axis, the chuck having means for holding a workpiece on the chuck, the chuck having on its underside a second bearing surface, such that when the chuck is stationary, the second bearing surface rests on the first bearing surface;

a grinding head having a least one grinding surface capable of grinding a workpiece mounted on the table, the grinding head being mounted for rotation about a head axis substantially parallel to the chuck axis; and transport means for moving the chuck relative to the grinding head in both directions along a transport axis substantially perpendicular to both the chuck axis and the head axis.

This grinding apparatus also comprises lubricating means provided on the table for introducing a lubricating fluid under superatmospheric pressure between the table and the chuck, thereby causing the chuck to lift away from the table; and control means arranged to first introduce the lubricating fluid through the lubricating means while the chuck is not rotating relative to the table, and thereafter to cause the chuck to rotate relative to the table.

This invention also provides a process for operating a grinding apparatus, which process comprises:

providing a table having a first bearing surface; a chuck mounted on the table for rotation about a chuck axis, the chuck having means for holding a workpiece on the chuck, the chuck having on its underside a second bearing surface, such that when the chuck is stationary, the second bearing surface rests on the first bearing surface; and a grinding head having a least one grinding surface capable of grinding a workpiece mounted on the table, the grinding head being mounted for rotation about a head axis substantially parallel to the chuck axis;

while the chuck is not rotating relative to the table, introducing a lubricating fluid under superatmospheric pressure between the table and the chuck, thereby causing the chuck to lift away from the table;

thereafter applying torque to the chuck, thereby causing the chuck to begin rotation relative to the table; and after the chuck is rotating at a predetermined rate relative to the table, lowering the pressure of the lubricating fluid substantially to atmospheric pressure.

DETAILED DESCRIPTION OF THE INVENTION

Figure 1:
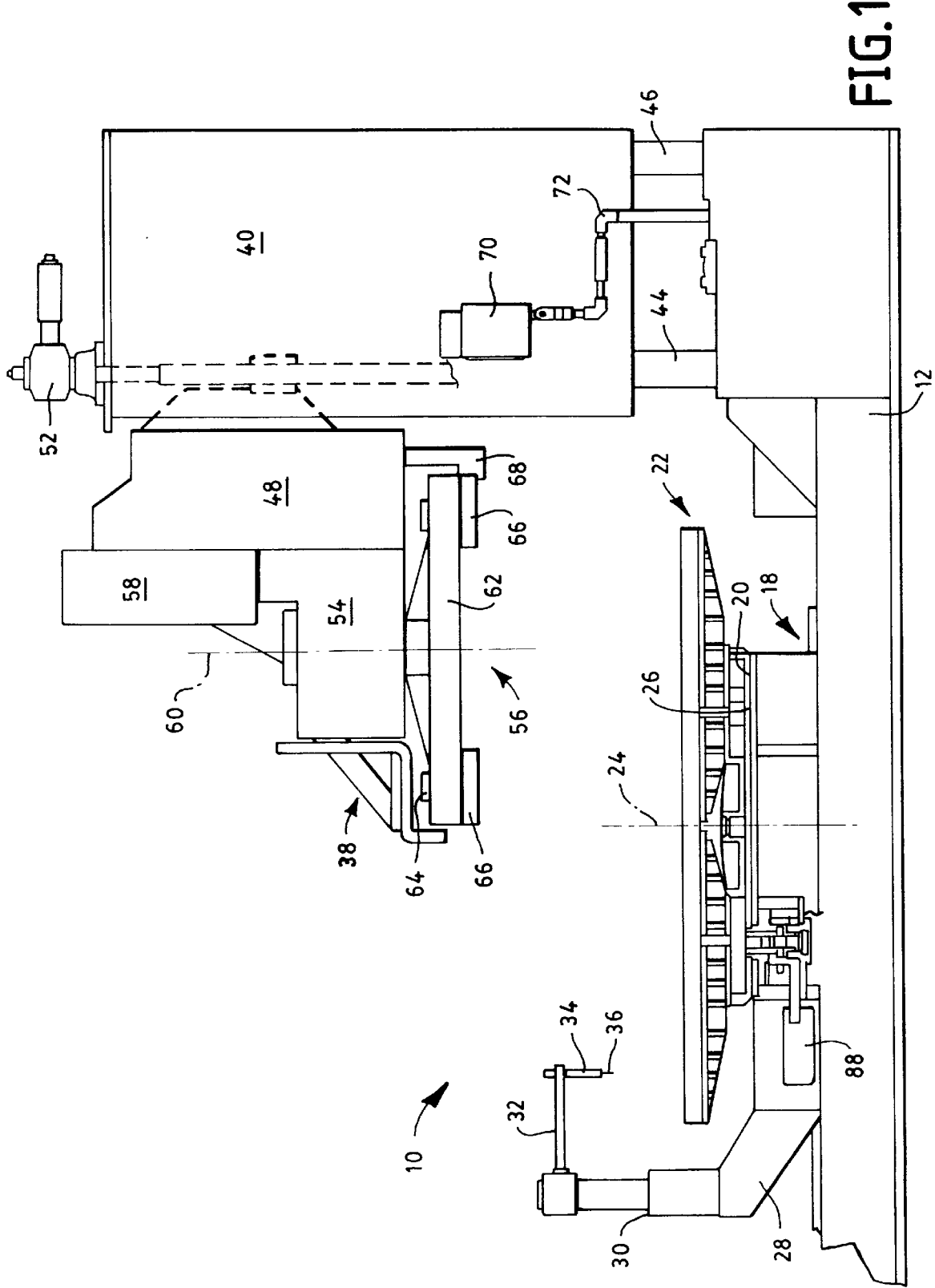
FIG. 1 of the accompanying drawings is a schematic side elevation of an apparatus of the present invention with some parts broken away to show construction details and other parts omitted for clarity, the apparatus being shown with the table and chuck in their grinding positions but with the grinding head in its uppermost, non-grinding position.

The accompanying drawings show a grinding apparatus of the present invention with a chuck having a diameter of 200 inches (5.08 m), For ease of illustration and comprehension, the accompanying drawings are somewhat simplified. Those skilled in the grinding art will appreciate that a grinding apparatus of this size generates very large amounts of heat and waste products (including metal dust, rust, scale etc.) during the grinding operation and that to cool the workpieces and the grinding heads while removing these waste products, it is necessary to supply large quantities of coolant and to make arrangements to drain this coolant, remove waste products therefrom and recycle the coolant. In the apparatus illustrated, coolant is supplied from two rows of nozzles extending parallel to the long axis of the apparatus and baffles are provided along the lateral edges of the base (i.e., along the upper edges of the base, as viewed in FIG. 2) to prevent splashing of coolant beyond the machine. However, these nozzles, the hoses supplying them, the baffles and the associated filtering and coolant recycling apparatus are all omitted from the drawings, since it is considered that provision of these parts of the apparatus is well within the skill of persons engaged in the grinding art.

The grinding apparatus (generally designated 10) shown in the accompanying drawings comprises a base member 12, which supports all the remaining components of the apparatus 10. The base member 12 carries a pair of horizontal parallel guideways 14 and 16. A table 18 is slidably mounted on the guideways 14 and 16 so as to be reciprocable in both directions along a horizontal transport axis 19 extending centrally and longitudinally along the base member 12; at its upper end, the table 18 is provided with a circular, horizontal first bearing surface 20, best seen in FIG. 4. A substantially cylindroconical chuck 22 is mounted on the table 18 for rotation about a vertical chuck axis 24 passing through the center of the chuck 22;

at its lower end, the chuck 22 is provided with a second bearing surface 26 which, when the chuck 22 is stationary, rests upon the first bearing surface 20 of the table 18. The chuck 22 is provided with electromagnets (not shown) capable of retaining a ferromagnetic load upon the upper surface of the chuck; to allow for the secure mounting of other loads upon the chuck 22, the chuck may also be provided with any convenient form of mechanical retaining means, and appropriate retaining devices will be familiar to those skilled in the grinding art.

Figure 2:
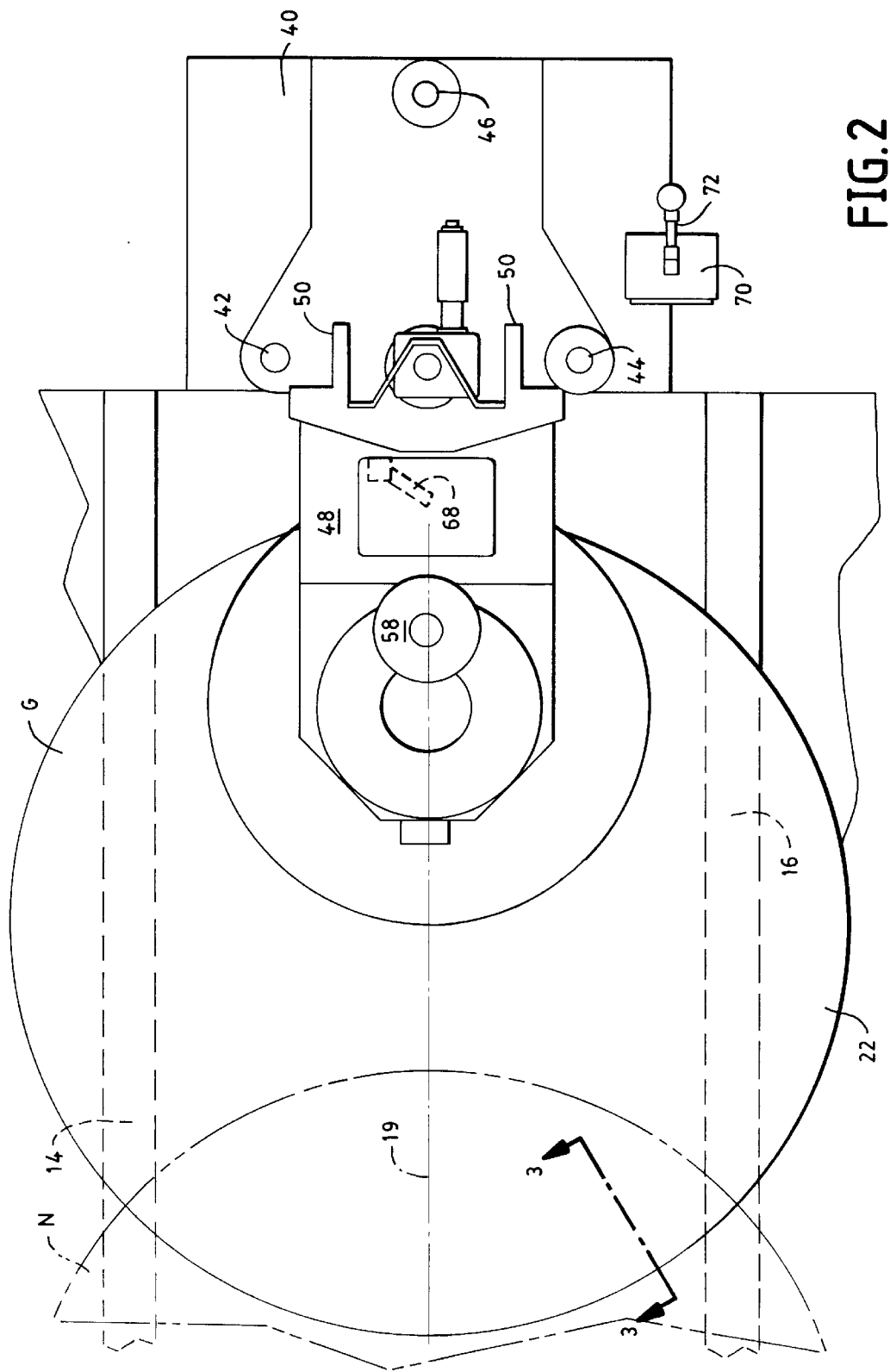
FIG. 2 is a schematic top plan view of the apparatus shown in FIG. 1 showing the range of movement of the table and chuck relative to the grinding head.

The table 18 carries a sidearm 28, which in turn supports a telescopic, hydraulically-operated column 30. From the upper end of the column 30 projects a horizontal arm 32 carrying, adjacent its free end, a vertical arm 34. A probe 36 is mounted on the lower end of the vertical arm 34 so as to lie above the periphery of the chuck 22, as best seen in FIG. 2. By controlling the column 30 until the probe 36 just touches a workpiece carried by the chuck 22, an operator can measure the thickness of the workpiece while it is still being ground, so that the operator can determine when the grinding operation is complete.

The grinding apparatus 10 further comprises a grinding head (generally designated 38) mounted upon the base member 12. The grinding head 38 itself comprises a base portion 40 which is mounted upon the base member 12 by means of three spaced mounts 42, 44 and 46 (see FIG. 2), the mounts 44 and 46 being of variable length, as described below. A movable portion 48 of the grinding head 38 is slidably mounted in grooves 50 located on the side of the base portion 40 facing the table 18 so as to be reciprocable vertically relative to the base portion 40, the vertical position of the movable portion 48 being controlled by an electric motor 52 disposed on the upper end of the base portion; this motor 52 moves the movable portion 48 via a worm and collar arrangement (not shown).

A grinding head assembly 54 is mounted on the face of the movable portion 48 remote from the base portion 40 and comprises a rotatable grinding tool 56 and a 600 horsepower electric motor 58 arranged to drive the tool 56 at variable speeds up to about 127 rpm about a vertical head axis 60. The tool 56 itself comprises a rotor 62, rotatable about a vertical head axis and carrying twenty-six stone holders 64, in which are releasably secured grinding stones 66.

To allow dressing of the stones 66, a dressing tool 68 is pivotally mounted on the lower end of the movable portion 48. As shown in broken lines in FIG. 2, the dressing tool 68 can be remotely controlled by an operator so as to move between a non-dressing position (in which the tool 68 lies essentially perpendicular to the transport axis 19 and does not contact any of the stones 66) and a dressing position (in which the tool 68 is pivoted to engage each of the stones 66 as they rotate past the tool 68).

As best seen in FIG. 2, the chuck 22 can be moved between two extreme positions, namely a non-grinding position N in which the whole upper surface of the chuck is clear of the grinding head 38, and a grinding position G, in which the stones 66 on the grinding head 38 contact the center of the chuck 22, so that the whole upper surface of any workpiece lying on the chuck 22 will be ground as the chuck 22 rotates. As already mentioned, the chuck 22 has a diameter of 200 inches (5.08 m); the diameter of the grinding head 38 (measured across of the outside edges of the stones 66, since this is the diameter which is actually ground) of 117 inches (2.97 m). Accordingly, when the chuck 22 is in the grinding position G, and the grinding head 38 is grinding over the entire surface of the chuck, the portion of the grinding head 38 adjacent the movable portion 48 lies beyond the periphery of the chuck 22 but adjacent the dressing tool 68, so that the dressing tool 68 can be used to dress the stones 66 while the grinding operation is proceeding.

A control panel 70 is mounted on the base member 12 via a Z-shaped support arm 72. This control panel 70 displays various parameters regarding the operation of the apparatus 10, and enables the apparatus 10 to be controlled by a single operator, who can watch the grinding operation and operate the control panel 70 at the same time.

Figure 3:
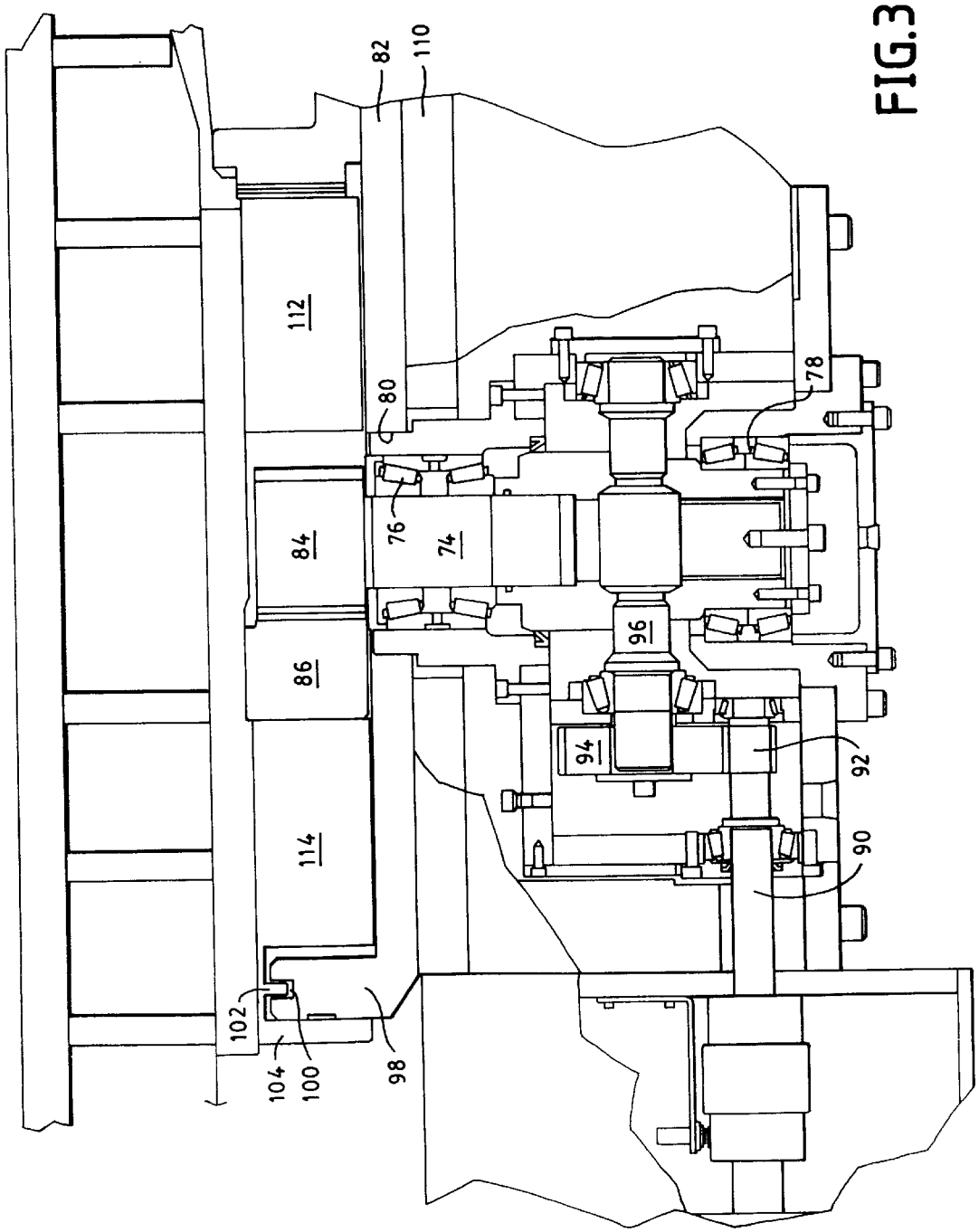
FIG. 3 is an enlarged cross-section along the line 3—3 in FIG. 1 showing details of the drive mechanism for the chuck.

FIG. 3 illustrates the drive mechanism used to rotate the chuck 22. As shown in FIG. 3, a vertical shaft 74 is supported by roller bearing assemblies 76 and 78 and extends through an aperture 80 (also shown in FIG. 4) provided in the plate 82 which forms the upper part of the table 12. The upper end of the shaft 74 carries a gear 84, which is meshed with a ring gear formed on a cylindrical flange 86 provided on the under surface of the chuck 22. The shaft 74 is itself driven by an electric motor 88 (see FIG. 1) via a horizontal shaft 90, meshed gears 92 and 94 and a second horizontal shaft 96.

Figure 4:
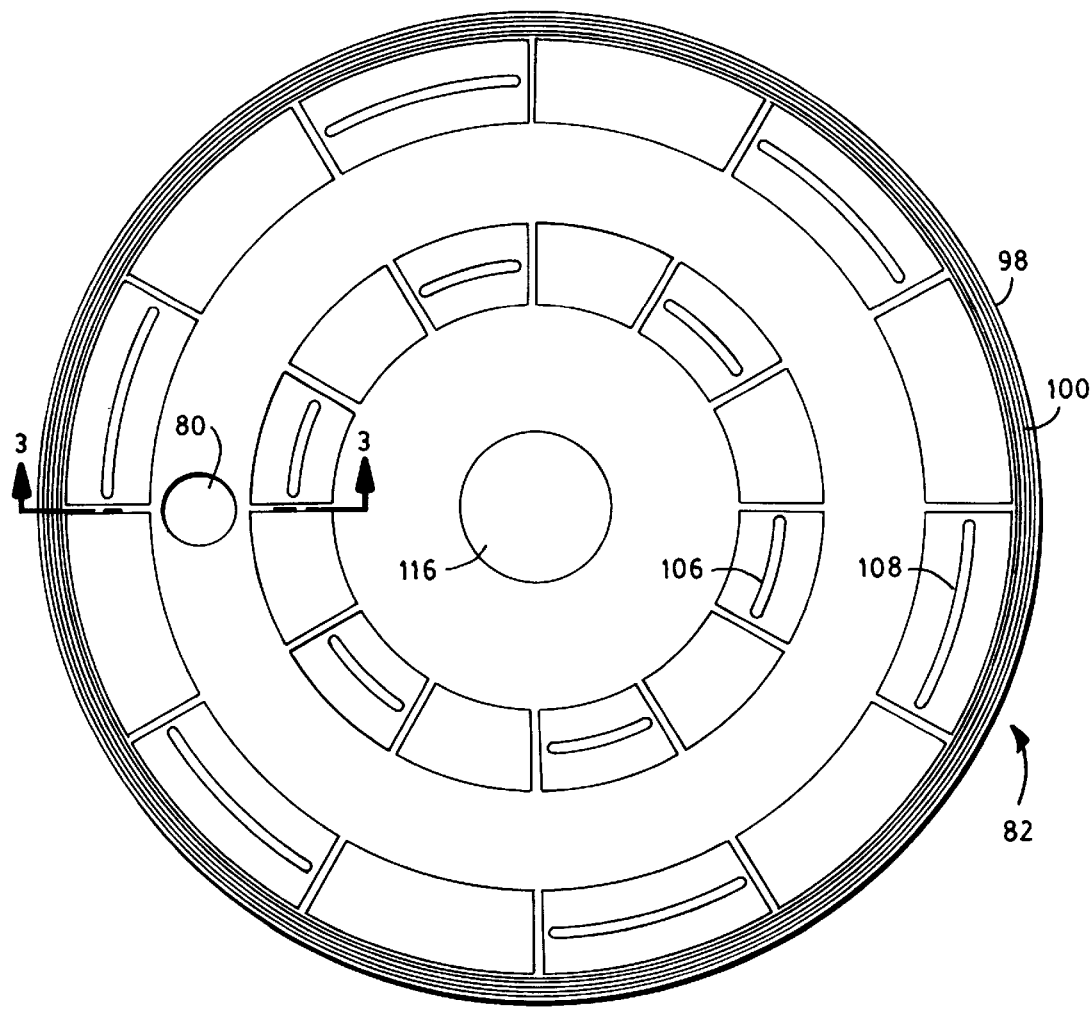
FIG. 4 is an enlarged top plan view of the table shown in FIGS. 1, 2 and 3.

FIG. 4 is a top plan view of the table 12 showing the plate 82. This plate 82 is essentially flat, except for an upstanding flange 98 extending around the periphery of the plate 82. As best seen in FIG. 3, this flange 98 has a groove 100, of rectangular cross-section, cut into its upper surface, and adjacent the flange 98 the chuck 22 is provided with a small cylindrical flange 102, which extends into the groove 100, and a larger cylindrical flange 104, which extends downwardly outside the outer surface of the flange 98. As explained in more detail below, the flanges 98, 102 and 104, and the groove 100, together act as a lubricating fluid retention means which prevents oil from leaking over the edge of the plate 82.

As shown in FIG. 4, the plate 82 is also provided with two sets of arcuate slots 106 and 108, each set comprising six slots distributed at angles of 60° to one another, with the slots 106 lying radially inwardly, and the slots 108 radially outwardly, of the aperture 80. The slots 106 and 108 extend completely through the plate 82 and connect with a plenum 110 lying immediately below the plate 82. The plenum 110 is equipped with pumping and pressuring means (not shown) of conventional type, which allow the plenum 110 to be filled with oil under varying pressure. As may be seen by comparing FIGS. 3 and 4, when the plenum 110 is not pressurized, so that the chuck 22 lies flat against the plate 82, the slots 106 and 108 are blocked by downwardly extending protrusions 112 and 114 respectively provided on the underside of the chuck 22. Finally, the plate 82 is provided with a central aperture 116 through which lubricating fluid can drain from the surface of the plate 82.

The chuck 22 itself weighs about 45,000 kg., and can carry a load of up to another 45,000 kg. Conventional practice in grinding machines of this type would be to make the plate 82 solid, and to provide lubricating fluid to the plate 82, so that the upper surface of the plate 82 forms an oil bath, in which the chuck 22 rests. However, the pressures exerted by the chuck 22 and the load carried thereon are so great that, the present inventors have found, simply providing such an oil bath does not achieve proper lubrication of the chuck 22, and a very large torque must be applied to the shaft 74 to begin rotation of the chuck 22, thus demanding a powerful and large motor 88 to drive the shaft 74. Furthermore, the surfaces of the chuck 22 in contact with the table 12 tend to wear rapidly because of lack of lubrication during startup. The provision of the pressurizable plenum 110 and the slots 106 and 108, together with the associate protrusions 112 and 114 respectively on the chuck 22 allow proper lubrication of the chuck 22 during startup, thus enabling the size of the motor 88, and the wear on the chuck 22, to be greatly reduced.

The operating sequence for the apparatus 10 is as follows. With the chuck 22 stationary, and in its non-grinding position N, a load is placed upon the chuck. The electromagnets within the chuck 22 are activated, thereby securing the load in position, and the supply of cooling fluid to the apparatus is switched on, Next, the lubricating fluid pressurizing means is activated to pressurize the plenum 110 within the table 12 to a high pressure, typically about 20 MPa. The high pressure lubricating fluid within the plenum 110 passes under pressure through the slots 106 and 108 in the plate 82, and thus contacts the protrusions 112 and 114 on the underside of the chuck 22, since when the chuck 22 is stationary the protrusions 112 and 114 block the upper ends of the slots 106 and 108 respectively. The pressure of the lubricating fluid acting on the lower ends of the protrusions 112 and 114 exceeds the combined weight of the chuck 22 and the load thereon, thus causing the chuck 22 to move upwardly a short distance (of the order of 0.1 mm) and a film of the lubricating fluid to spread between the first bearing surface (the upper surface of the plate 82) and the second bearing surface (the lower surfaces of the chuck 22). The flange 98 prevents the lubricating fluid from leaving the periphery of the plate 82, while the central aperture 116 in this plate prevents excessive accumulation of lubricating fluid on the plate.

With a film of lubricating fluid now in place between the bearing surfaces, the motor 88 is energized to begin rotation of the chuck 22; because of the "preformed" film of lubricant between the bearing surfaces, a smooth startup of chuck rotation occurs without danger of any jerks which might cause damage to the motor 88 or other parts of the apparatus, or movement of the load relative to the chuck. It has been found that, once the chuck 22 and the load are rotating at about 1 rpm., the pressurization of the lubricating fluid can be terminated (thus avoiding unnecessary wear on the pump used for such pressurization) since the rotating chuck entrains sufficient lubricating fluid between the bearing surfaces to provide proper lubrication of the chuck, and the chuck achieves its desired full rotation speed without any excess load being placed on the motor 88.

The remainder of the operating cycle of the apparatus 10 is similar to prior art apparatus. The chuck 22 is moved to its grinding position G, the grinding head 38 is brought to its operating rotating speed, and lowered on to the load carried by the chuck 22 to effect grinding, with the progress of this grinding being measured by the probe 36. If necessary, the dressing tool 68 is used to dress the grinding stones 66. When the desired amount of grinding has been effected, the grinding head is raised so that the stones 66 no longer contact the load, the chuck 22 is retracted to its non-grinding position N, the motor 88 is de-energized, and the chuck and load are allowed to cease rotating. In view of the weights of the chuck and load, it is considered undesirable to attempt to brake to rotation of the chuck and load, and hence they are allowed to cease rotation simply by the natural frictional forces acting on the chuck; naturally, the electromagnets in the chuck are left energized until rotation of the chuck has completely ceased, in order to prevent any slippage of the load relative to the chuck. The load can now be removed from the chuck, and a new grinding cycle begun.

From the foregoing, it will be seen that the grinding apparatus of the present invention allows for a smooth startup of chuck rotation without requiring a powerful motor and without causing unnecessary wear on the chuck or table. The smooth startup also avoids undesirable jerks to the chuck and the load thereon, thus avoiding the risks of damage to the apparatus and injury to operators due to such jerks.

I claim:

1. In a grinding apparatus comprising:

a table having a first bearing surface;

a chuck mounted on the table for rotation about a chuck axis, the chuck having means for holding a workpiece on the chuck, the chuck having on its underside a second bearing surface, such that when the chuck is stationary, the second bearing surface rests on the first bearing surface;

a grinding head having a least one grinding surface capable of grinding a workpiece mounted on the table, the grinding head being mounted for rotation about a head axis substantially parallel to the chuck axis; and transport means for moving the chuck relative to the grinding head in both directions along a transport axis substantially perpendicular to both the chuck axis and the head axis, the improvement which comprises:

lubricating means comprising a plurality of ports provided in the first bearing surface of the table such that when the second bearing surface of the chuck is resting on the first bearing surface of the table, the second bearing surface closes the ports, the lubricating means further comprising means for introducing a lubricating fluid under superatmospheric pressure through the ports, thereby causing the chuck to lift away from the table; and control means arranged to first introduce the lubricating fluid through the ports while the chuck is not rotating relative to the table, and thereafter to cause the chuck to rotate relative to the table.

2. A grinding apparatus according to claim 1 wherein the control means is arranged to lower the pressure of the lubricating fluid supplied by the lubricating means substantially to atmospheric pressure once the chuck is rotating at a predetermined rate relative to the table.

3. A grinding apparatus according to claim 1 wherein the superatmospheric pressure is at least about 1 MPa (140 psia) and the chuck has a mass of at least about 25,000 kg.

4. A grinding apparatus according to claim 1 wherein the table and chuck are provided with lubricating fluid retention means for inhibiting flow of the lubricating fluid outwardly off the periphery of the table.

5. A grinding apparatus according to claim 4 wherein the lubricating fluid retention means comprises a cylindrical flange upstanding from the table, this flange having walls defining a groove in its upper surface, and a cylindrical detent extending downwardly from the chuck and having its lower end received within the groove in the cylindrical flange.

6. A grinding apparatus according to claim 1 wherein the chuck has essentially the form of an oblate cylinder and the grinding head is provided with a plurality of grinding elements arranged in a ring, the diameter of this ring being greater than half the diameter of the chuck so that when one portion of the ring of grinding elements is grinding a workpiece at the center of the cylindrical chuck, another portion of the ring of grinding elements protrudes beyond the periphery of the chuck, the grinding apparatus further comprising dressing means arranged to dress the grinding surfaces of the grinding elements, the dressing means being disposed adjacent said protruding portion of the ring of grinding elements.

7. A grinding apparatus according to claim 1 wherein the chuck is provided with a plurality of electromagnets arranged to hold a ferromagnetic workpiece on the upper surface of the chuck.

8. A grinding apparatus according to claim 1 further comprising sensing means disposed above the chuck and arranged to sense the position of the upper surface of a workpiece held upon the chuck.

9. A grinding apparatus according to claim 1 wherein the chuck has a downwardly extending flange on which is formed a ring gear, and the table is provided with a driven gear engaged with the ring gear on the chuck.

10. A grinding apparatus comprising:

a table having a first bearing surface;

a chuck mounted on the table for rotation about a chuck axis, the chuck having means for holding a workpiece on the chuck, the chuck having on its underside a second bearing surface, such that when the chuck is stationary, the second bearing surface rests on the first bearing surface;

a grinding head having a least one grinding surface capable of grinding a workpiece mounted on the table, the grinding head being mounted for rotation about a head axis substantially parallel to the chuck axis; and transport means for moving the chuck relative to the grinding head in both directions along a transport axis substantially perpendicular to both the chuck axis and the head axis, lubricating means provided on the table for introducing a lubricating fluid under superatmospheric pressure between the table and the chuck, thereby causing the chuck to lift away from the table; and control means arranged to first introduce the lubricating fluid through the lubricating means while the chuck is not rotating relative to the table, and thereafter to cause the chuck to rotate relative to the table wherein the table and the grinding head are mounted upon a common base member, the grinding head being mounted on the base member by three spaced mounting means, at least two of which permit vertical adjustment of the grinding head relative to the base member, so that by such vertical adjustment the head axis can be tilted relative to the base about two axes which lie perpendicular to the head axis and to each other.

11. A process for operating a grinding apparatus, which process comprises:

providing a table having a first bearing surface; a chuck mounted on the table for rotation about a chuck axis, the chuck having means for holding a workpiece on the chuck, the chuck having on its underside a second bearing surface, such that when the chuck is stationary, the second bearing surface rests on the first bearing surface; and a grinding head having a least one grinding surface capable of grinding a workpiece mounted on the table, the grinding head being mounted for rotation about a head axis substantially parallel to the chuck axis;

while the chuck is not rotating relative to the able, introducing a lubricating fluid under superatmospheric pressure between the table and the chuck, thereby causing the chuck to lift away from the table;

thereafter applying torque to the chuck, thereby causing the chuck to begin rotation relative to the table; and after the chuck is rotating at a predetermined rate relative to the table, lowering the pressure of the lubricating fluid substantially to atmospheric pressure.

12. A process according to claim 11 wherein the superatmospheric pressure is at least about 1 MPa (140 psia) and the chuck has a mass of at least about 25,000 kg.

13. A process according to claim 11 further comprising providing lubricating fluid retention means arranged to inhibit flow of the lubricating fluid outwardly off the periphery of the table.

14. A process according to claim 13 wherein the lubricating fluid retention means comprises a cylindrical flange upstanding from the table, this flange having walls defining a groove in its upper surface, and a cylindrical detent extending downwardly from the chuck and having its lower end received within the groove in the cylindrical flange.

15. A process according to claim 11 wherein the chuck has essentially the form of an oblate cylinder and the grinding head is provided with a plurality of grinding elements arranged in a ring, the diameter of this ring being greater than half the diameter of the chuck so that when one portion of the ring of grinding elements is grinding a workpiece at the center of the cylindrical chuck, another portion of the ring of grinding elements protrudes beyond the periphery of the chuck, the process further comprising dressing the grinding surfaces of the grinding elements within said protruding portion of the ring of grinding elements, while the grinding head is grinding a workpiece retained on the chuck.

16. A process according to claim 11 wherein the chuck is provided with a plurality of electromagnets, the process further comprising placing a ferromagnetic workpiece on the upper surface of the chuck, passing current through the electromagnets to retain the workpiece on the chuck, and contacting at least one grinding surface of the grinding head with the workpiece while said current is being passed.

17. A process according to claim 11 wherein the table and the grinding head are mounted upon a common base member, the grinding head being mounted on the base member by three spaced mounting means, at least two of which permit vertical adjustment of the grinding head relative to the base member, so that by such vertical adjustment the head axis can be tilted relative to the base about two axes which lie perpendicular to the head axis and to each other.

18. A process according to claim 11 further comprising providing sensing means disposed above the chuck and arranged to sense the position of the upper surface of a workpiece held upon the chuck, and operating said sensing means to sense the position of said upper surface of the workpiece while the workpiece is mounted upon the chuck.

19. A process according to claim 11 wherein the chuck has a downwardly extending flange on which is formed a ring gear, and the table is provided with a driven gear engaged with the ring gear on the chuck, and wherein said application of torque to the chuck is effected by driving the driven gear.

* * * * *